(12) United States Patent
Reynolds et al.

(10) Patent No.: US 11,914,946 B2
(45) Date of Patent: *Feb. 27, 2024

(54) BULK ENVELOPE MANAGEMENT IN A DOCUMENT MANAGEMENT SYSTEM

(71) Applicant: DocuSign, Inc., San Francisco, CA (US)

(72) Inventors: Robert Reynolds, Tahuya, WA (US); Zdravko Pavlinov Peev, Redmond, WA (US); Michael Brian Bresloff, Seattle, WA (US); Ekenechukwu Anene, Oakland, CA (US); Janice Bae, Redwood City, CA (US); Harshavardhana Ashok, Seattle, WA (US); David Minoru Hirotsu, Torrance, CA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,675

(22) Filed: Nov. 22, 2022

(65) Prior Publication Data

US 2023/0351100 A1 Nov. 2, 2023

Related U.S. Application Data

(63) Continuation of application No. 17/733,845, filed on Apr. 29, 2022, now Pat. No. 11,537,782.

(51) Int. Cl.
*G06F 40/166* (2020.01)
*G06F 16/93* (2019.01)

(52) U.S. Cl.
CPC ............ *G06F 40/166* (2020.01); *G06F 16/93* (2019.01)

(58) Field of Classification Search
CPC ...................................................... G06F 40/166
See application file for complete search history.

(56) References Cited

U.S. PATENT DOCUMENTS 11,537,782 B1 12/2022 Reynolds et al.
2008/0005024 A1* 1/2008 Kirkwood .............. G06Q 40/00
(Continued)

FOREIGN PATENT DOCUMENTS

WO 2015089171 A1 6/2015

OTHER PUBLICATIONS

Prosecution History from U.S. Appl. No. 17/328,370, dated Aug. 18, 2022 through May 5, 2023, 32 pp.
(Continued)

*Primary Examiner* — James J Debrow
(74) *Attorney, Agent, or Firm* — Shumaker & Sieffert, P.A.

(57) ABSTRACT

A document management system sends a distinct copy of a set of documents to each of a plurality of recipients in a bulk sending process, producing a batch of document sets. The document management system can facilitate the performance of a bulk action on the batch of document sets by a sending entity. Examples include a bulk corrective action, a bulk void action, a bulk re-send action, and a bulk download action. In addition, the document management system can identify document sets sent separately that are likely parts of a batch of document sets using one or more similarity criteria. The document management system can recommend that a sending entity combine the identified document sets into a batch of document sets, enabling the sending entity to perform bulk actions on the document sets.

20 Claims, 8 Drawing Sheets

(56) References Cited

U.S. PATENT DOCUMENTS

| | | | |
|---|---|---|---|
| 2008/0278740 | A1 | 11/2008 | Bird et al. |
| 2016/0162697 | A1 | 6/2016 | Follis |
| 2016/0170950 | A1 | 6/2016 | Malden |
| 2018/0234562 | A1* | 8/2018 | Kamekawa ........ H04N 1/00477 |
| 2019/0147402 | A1 | 5/2019 | Sitrick et al. |
| 2021/0049320 | A1 | 2/2021 | Shimkus |
| 2022/0188885 | A1* | 6/2022 | Blackman et al. .... G06Q 30/04 |
| 2022/0374583 | A1 | 11/2022 | Bresloff et al. |
| 2023/0032005 | A1* | 2/2023 | Marin et al. ............ G06F 16/93 |

OTHER PUBLICATIONS

Prosecution History from U.S. Appl. No. 17/733,845, now U.S. Pat. No. 11,537,782, dated Sep. 1, 2022 through Sep. 20, 2022, 12 pp.
Notice of Allowance from U.S. Appl. No. 17/328,370 dated Jun. 1, 2023, 8 pp.
International Search Report and Written Opinion of International Application No. PCT/US2023/020462 dated Aug. 29, 2023, 16 pp.
U.S. Appl. No. 18/473,341, filed Sep. 25, 2023, naming inventors Bresloff et al.

* cited by examiner

300

| | | | |
|---|---|---|---|
| Home | Manage | Templates | Reports |

Bulk Sends
Filtered by: Date (Last 6 Months)

🔍 Search by Batch Name or ID    ≡ FILTERS — 340

330

| Batch Name | Batch Status | Progress | Submitted |
|---|---|---|---|
| New Hires January 2021 | In Progress | 20/100 Sent | 01/18/2021 |
| Annual Bonus Employees | Processed | 97/100 Sent | 12/31/2020 |
| New Benefits | Processed | 9099/9100 Sent | 11/16/2020 |
| Re-Certifications April 2021 | Processed | 100/100 Sent | 04/01/2021 |

310 — (New Hires January 2021 row)
320 — (New Benefits row)

| Home | Manage | Templates | Reports |

New Hires January 2021
Batch ID

350 — Search Envelopes in Batch

360 — FILTERS

370 — ⚠ 1 Envelope failed to be created. [BATCH ERRORS] — 375

| Subject | Status | Last Update | |
|---|---|---|---|
| ⚠ Please Sign: New Hire Agreement.pdf<br>To: Adam | Declined | 01/18/2021 | ACTION ▼ |
| ✓ Please Sign: New Hire Agreement.pdf<br>To: Nancy | Completed | 01/10/2021 | Correct<br>Re-send<br>Void |
| 🕐 Please Sign: New Hire Agreement.pdf<br>To: Jack | Received | 01/05/2021 | |
| 🕐 Please Sign: New Hire Agreement.pdf<br>To: Mary | Viewed | 01/05/2021 | ACTION ▼ |

380 — Status column
385 — Last Update column
390 — Action menu

Send a distinct copy of a set of documents to each of a plurality of recipients in a bulk sending process
410

---

Generate an interface that displays, for each copy of the set of documents, the recipient of the copy and a status of the copy
420

---

Receive an identification of a subset of the copies of the set of documents
430

---

Perform a bulk action on each of the subset of the copies without performing the bulk action on any remaining copies of the set of documents
440

```
┌─────────────────────────────────────────────────────────────────────┐
│ Send a batch of document sets to each of a plurality of recipients  │
│ in a bulk sending process                                           │
│                              510                                    │
└─────────────────────────────────────────────────────────────────────┘
                                  ↓
┌─────────────────────────────────────────────────────────────────────┐
│ Generate an interface that displays, for each set of documents in   │
│ the batch, the recipient and status of the set of documents         │
│                              520                                    │
└─────────────────────────────────────────────────────────────────────┘
                                  ↓
┌─────────────────────────────────────────────────────────────────────┐
│ Receive a request to perform a bulk correction action on the batch  │
│ of document sets                                                    │
│                              530                                    │
└─────────────────────────────────────────────────────────────────────┘
                                  ↓
┌─────────────────────────────────────────────────────────────────────┐
│ Identify a first subset of the batch of document sets that have     │
│ not been executed                                                   │
│                              540                                    │
└─────────────────────────────────────────────────────────────────────┘
                                  ↓
┌─────────────────────────────────────────────────────────────────────┐
│ Identify a second subset of the batch of document sets that have    │
│ been executed                                                       │
│                              550                                    │
└─────────────────────────────────────────────────────────────────────┘
                                  ↓
┌─────────────────────────────────────────────────────────────────────┐
│ Perform the bulk correction action on the first subset of the batch │
│ of document sets                                                    │
│                              560                                    │
└─────────────────────────────────────────────────────────────────────┘
                                  ↓
┌─────────────────────────────────────────────────────────────────────┐
│ Perform an alternative bulk correction action on the second subset  │
│ of the batch of document sets                                       │
│                              570                                    │
└─────────────────────────────────────────────────────────────────────┘
```

```
┌─────────────────────────────────────────────────────────────────────┐
│ Send a batch of document sets to each of a plurality of recipients  │
│                     in a bulk sending process                       │
│                                 610                                 │
└─────────────────────────────────────────────────────────────────────┘
                                   ↓
┌─────────────────────────────────────────────────────────────────────┐
│ Generate an interface that displays, for each set of documents in   │
│         the batch, the recipient and status of the set of documents │
│                                 620                                 │
└─────────────────────────────────────────────────────────────────────┘
                                   ↓
┌─────────────────────────────────────────────────────────────────────┐
│   Receive a request to perform a bulk void action on the batch of   │
│                           document sets                             │
│                                 630                                 │
└─────────────────────────────────────────────────────────────────────┘
                                   ↓
┌─────────────────────────────────────────────────────────────────────┐
│  Identify a first subset of the batch of document sets that have    │
│                          not been executed                          │
│                                 640                                 │
└─────────────────────────────────────────────────────────────────────┘
                                   ↓
┌─────────────────────────────────────────────────────────────────────┐
│  Identify a second subset of the batch of document sets that have   │
│                            been executed                            │
│                                 650                                 │
└─────────────────────────────────────────────────────────────────────┘
                                   ↓
┌─────────────────────────────────────────────────────────────────────┐
│   Perform the bulk void action on the first subset of the batch of  │
│                           document sets                             │
│                                 660                                 │
└─────────────────────────────────────────────────────────────────────┘
                                   ↓
┌─────────────────────────────────────────────────────────────────────┐
│ Perform an alternative bulk void action on the second subset of the │
│                       batch of document sets                        │
│                                 670                                 │
└─────────────────────────────────────────────────────────────────────┘
```

```
┌─────────────────────────────────────────────────────────────────────────┐
│ Access document sets sent individually by a sending entity to a         │
│ plurality of recipients                                                 │
│ 710                                                                     │
└─────────────────────────────────────────────────────────────────────────┘
                                    ↓
┌─────────────────────────────────────────────────────────────────────────┐
│ Identify a subset of the accessed document sets that satisfy one or     │
│ more similarity criteria                                                │
│ 720                                                                     │
└─────────────────────────────────────────────────────────────────────────┘
                                    ↓
┌─────────────────────────────────────────────────────────────────────────┐
│ Modify an interface presented to the sending entity to include a        │
│ suggestion to combine the identified subset of the accessed document    │
│ sets                                                                    │
│ 730                                                                     │
└─────────────────────────────────────────────────────────────────────────┘
                                    ↓
┌─────────────────────────────────────────────────────────────────────────┐
│ In response to accepting the suggestion, combine the identified subset  │
│ into a batch of document sets                                           │
│ 740                                                                     │
└─────────────────────────────────────────────────────────────────────────┘
                                    ↓
┌─────────────────────────────────────────────────────────────────────────┐
│ Receive a request to perform a bulk action from the sending entity      │
│ 750                                                                     │
└─────────────────────────────────────────────────────────────────────────┘
                                    ↓
┌─────────────────────────────────────────────────────────────────────────┐
│ Perform the bulk action on document sets within the batch but not on    │
│ the accessed document sets not included in the batch                    │
│ 760                                                                     │
└─────────────────────────────────────────────────────────────────────────┘
```

FIG. 7

BULK ENVELOPE MANAGEMENT IN A DOCUMENT MANAGEMENT SYSTEM

CROSS REFERENCE TO RELATED APPLICATIONS

This application is a continuation of U.S. application Ser. No. 17/733,845, filed Apr. 29, 2022, now patent Ser. No. 11/537,782, which is incorporated by reference in its entirety.

BACKGROUND

The disclosure generally relates to a document management system, and more specifically to managing a bulk sending process of copies of a set of documents using the document management system.

A document management system can enable a sending entity to send one or more documents to a plurality of receiving entities. For example, each receiving entity may receive an envelope including the one or more documents from the sending entity. The sending entity may send the envelope to hundreds or thousands of receiving entities at a time in a bulk sending process. In current document management systems, the sending entity may have little to no insight regarding status of the envelopes. For example, if an error occurs during the send, such as one envelope failed of the hundreds sent, the sending entity will need to perform a timely, manual investigation into which envelope failed to send and why. The sending entity may wish to perform an action, such as a correction, on some or all of the envelopes. In current systems, the sending entity will need to manually select each individual envelope of the hundreds or thousands and perform the correction. This can be time consuming and can result in envelopes that needed correction being overlooked by the sending entity.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A illustrates a first example user interface for managing a bulk sending process, in accordance with an embodiment.

FIG. 3B illustrates a second example user interface for managing a bulk sending process, in accordance with an embodiment.

FIG. 4 is a flowchart illustrating a process of performing a bulk action on a subset of envelopes in a batch, in accordance with an embodiment.

FIG. 5 is a flowchart illustrating a process of performing a bulk correction action on envelopes in a batch, in accordance with an embodiment.

FIG. 6 is a flowchart illustrating a process of performing a bulk void action on envelopes in a batch, in accordance with an embodiment.

FIG. 7 is a flowchart illustrating a process of combining envelopes sent separately into a batch of envelopes, in accordance with an embodiment.

Figure 1:
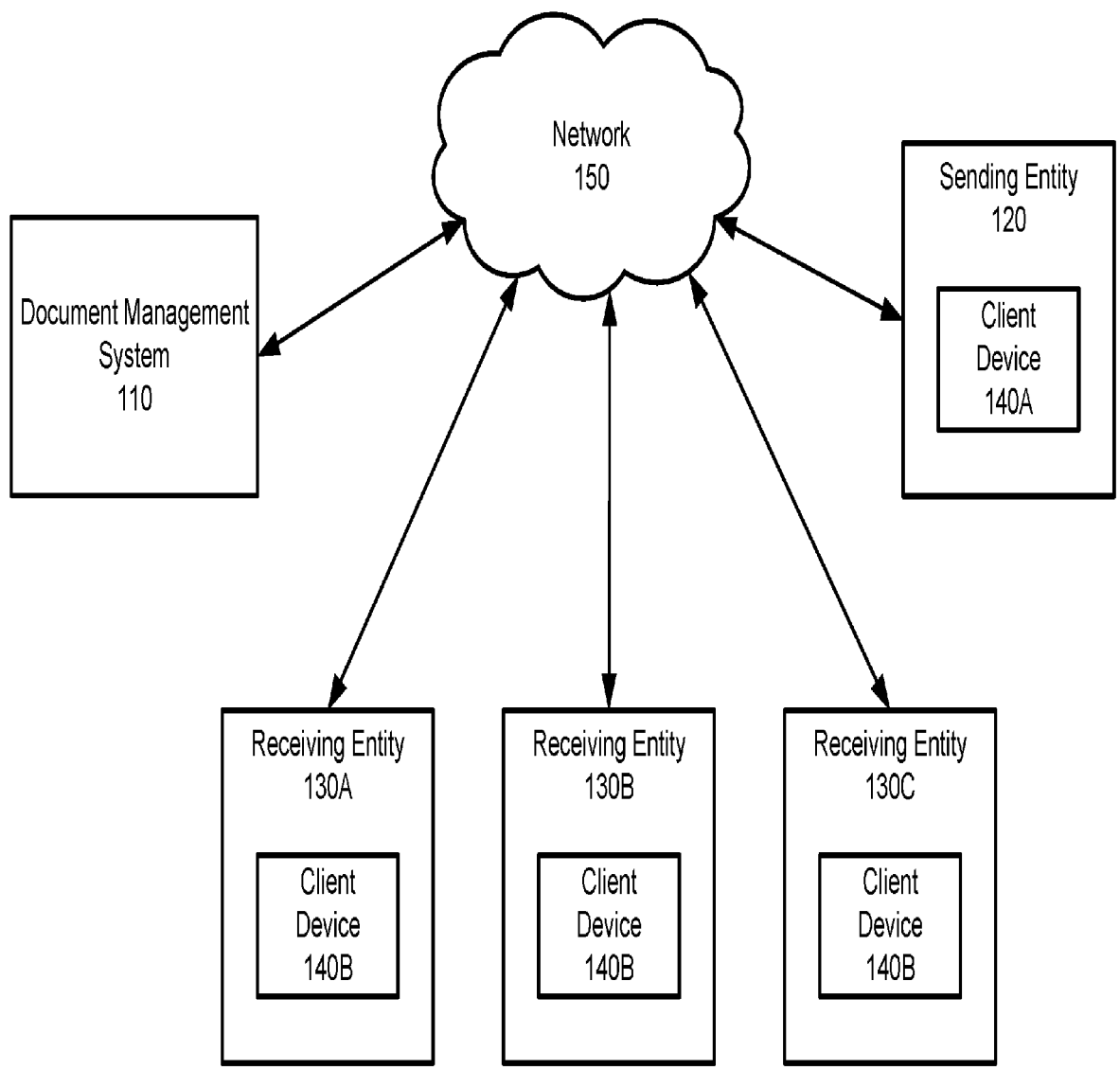
FIG. 1 is a block diagram of a system environment in which a document management system operates, in accordance with an embodiment.

The figures depict various example embodiments of the present technology for purposes of illustration only. One skilled in the art will readily recognize from the following description that other alternative embodiments of the structures and methods illustrated herein may be employed without departing from principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

A system environment enables a sending entity to create and send documents to a plurality of receiving entities for negotiation, collaborative editing, electronic execution (e.g., electronic signature), automation of contract fulfilment, archival, and analysis, among other tasks. Within the system environment, a receiving entity may review content and/or terms presented in a document, and in response to agreeing to the content and/or terms, can electronically execute the document. In some embodiments, the sending entity generates a distinct copy (also referred to as an envelope) of a set of documents to provide to each of the plurality of receiving entities in a bulk sending process. The bulk sending process allows the sending entity to generate and send a batch of copies to a plurality of receiving entities where each receiving entity receives a distinct copy of the set of documents. For example, the sending entity may generate a batch to include a thousand distinct copies to provide to a thousand distinct receiving entities.

Within the system environment, the sending entity may view information about the batch including a status of the batch, a status of each copy within the batch, any errors that took place prior or during the bulk send, which copies have been viewed by a corresponding receiving entity, which copies have been edited by a corresponding receiving entity, which copies have been executed by a corresponding recipient, etc. The sending entity can perform one or more actions both individually and in bulk on the copies within a batch. The actions may include making a correction to a copy or a subset of copies, re-sending a copy or a subset of copies, and/or voiding a copy or a subset of copies. It should also be noted that "receiving entity", "recipient", "acting entity", and other similar terminology are used interchangeably herein.

The system environment described herein can be implemented within a document management system, a centralized document system, an online document system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Figure (FIG. 1 is a block diagram of a system environment in which a document management system operates, in accordance with an embodiment. The system environment 100 illustrated in FIG. 1 includes a document management system 110, a sending entity 120 associated with a client device 140A, a plurality of receiving entities 130 (e.g., a receiving entity 130A, a receiving entity 130B, and a receiving entity 130C) each associated with a corresponding client device 140B, and a network 150. In alternative configurations, different and/or additional components may be included in the system environment 100.

The document management system 110 is a computer system (or group of computer systems) for storing and managing documents, copies (also referred to as envelopes), and/or batches of copies for a plurality of users (e.g., the sending entity 120 and the receiving entities 130). Using the document management system 110, the users can collaborate to create, edit, review, negotiate, and execute documents. A document may be a contract, agreement, purchase order, or any other document.

Prior to execution of the documents, the document management system 110 may generate a copy to include a set of documents for execution. The document management system 110 may generate the copy per a request from the sending entity 120. The set of documents included in the copy may include documents of various document types, for example contracts, purchase agreements, codes of conduct, lease agreements, bank forms, permission slips, term sheets, etc. Each document in the set of documents includes document content (e.g., words, images, etc.). In addition to the set of documents included in each copy, a distinct set of acting entities is included in a copy. The set of acting entities may be one or more individuals at a receiving entity 130 (e.g., at receiving entity 130A) that can perform one or more actions with respect to the set of documents. The one or more actions may include viewing, editing, declining, and/or executing the set of documents in the copy. In some embodiments, the documents (including the document content) may have been previously negotiated by two or more users (e.g., by the sending entity 120 and the receiving entity 130A).

The document management system 110 may generate a copy to include a set of documents for execution by a plurality of receiving entities 130 (e.g., per a request from the sending entity 120). The document management system 110 generates a batch of copies of the set of documents in a bulk sending process. The document management system 100 sends the batch by providing a distinct copy of the set of documents to the receiving entity 130A, the receiving entity 130B, and the receiving entity 130C. In some embodiments, the set of documents of any or all copies within a batch may contain some customized document content.

The document management system 100 can generate a batch of copies of a set of documents in a bulk sending process that are provided to hundreds or thousands of receiving entities 130. In order to manage any bulk sending process, the document management system 110 generates an interface (e.g., to be displayed via the client devices 140) that displays information about a batch and about each copy within the batch. For example, the interface may display information about the recipient of a copy and a status of the copy. In some embodiments, the document management system 110 updates the status of the copy based on one or more actions performed by a corresponding recipient. Information about the batch displayed in the interface may additionally include a status of the batch and/or any errors that took place prior or during the bulk send. The interface provides a means for the sending entity 120 to perform an action on a batch, on a subset of copies within a batch, or on a copy within a batch. The action performed may include making a correction, re-sending, and/or voiding the batch, the subset of copies, or a copy.

The document management system 110 can be a server, server group or cluster (including remote servers), or another suitable computing device or system of devices. In some implementations, the document management system 110 can communicate with client devices 140 over the network 150 to receive instructions and send copies (or other information) for viewing on client devices 140. The document management system 110 will be discussed in further detail with respect to FIG. 2.

The sending entity 120 prepares and sends copies of a set of documents to the plurality of receiving entities 130 via the document management system 110. For example, the sending entity 120 instructs the document management system 110 to prepare and send a batch of copies to the plurality of receiving entities 130 in a bulk sending process. The sending entity 120 may be an individual, an organization, a company, a group, an account, etc. The sending entity 120 can be associated with a user account, username, email address, or other identifier that can be used by the document management system 110 to identify the sending entity 120 and to control the ability of the sending entity 120 to view, modify, and otherwise interact with the copy managed by the document management system 110. In some implementations, the sending entity 120 can interact with the document management system 110 through their user account with the document management system 110 and one or more client devices 140 accessible to that sending entity 120. The sending entity 120 may be an administrator of the copies (or batch), which may be an individual who created the copies (or created one or more documents of the set of documents included in the copies) and/or who has authority to view, edit, and/or send the copies (or batch).

In an example implementation, the sending entity 120 may be a human resource representative for an organization. The representative requests the document management system 110 prepare and send a batch of copies of a set of documents related to updates to the organization's code of conduct to a plurality of receiving entities 130 (e.g., all employees within the organization). Each receiving entity 130 (each employee) will receive a distinct copy of the set of documents. In this example implementation, the set of documents in each copy of the batch may be customized for each receiving entity 130, for example the employee's name, hire date, and employee identification number is included within the document contents.

The receiving entities 130 (also referred to as recipients) receive copies of the set of documents. Each receiving entity 130 can receive a distinct copy of the set of documents. A receiving entity 130 may be an individual, an organization, a company, a group, an account, etc. In some embodiments, a receiving entity 130 can be associated with a user account, username, email address, or other identifier that is used by the document management system 110 to identify the receiving entity 130 and to control the ability of the receiving entity 130 to view, modify, and otherwise interact with the copy and set of documents managed by the document management system 110. For example, a receiving entity 130 can interact with the document management system 110 through a user account with the document management system 110 and one or more client devices 140 accessible to that receiving entity 130. In some embodiments, the sending entity 120 and a receiving entity 130 may be associated with a same organization and/or a same company. The receiving entities 130 can perform one or more actions associated with a received copy of the set of documents. For example, a receiving entity 130 can view the copy, can edit the copy, decline the copy, and/or can execute the copy. A receiving entity 130 may perform any of the one or more actions via the document management system 110.

Each client device 140 is a computing device capable of receiving user input (for example from the sending entity 120) as well as transmitting and/or receiving data to the document management system 110 via the network 150. For example, a client device 140 can be a desktop or a laptop computer, a smartphone, tablet, or another suitable device. Client devices 140 are configured to communicate via the network 150 (for example, with the document management system 110). In one embodiment, a client device 140 executes an application allowing a user of the client device 140 to interact with the document management system 110. For example, a client device 140 can execute a browser application to enable interaction between the client device 140 and the document management system 110 via the network 150. In some embodiments, a single user can be associated with multiple client devices 140, and/or one client device 140 can be shared between multiple users who may, for example, log into a personal account on the client device 140 to access the document management system 110.

The network 150 transmits data within the system environment 100. The network 150 may comprise any combination of local area and/or wide area networks, using both wired and/or wireless communication systems, such as the Internet. In some embodiments, the network 150 transmits data over a single connection (e.g., a data component of a cellular signal, or Wi-Fi, among others), and/or over multiple connections. In some embodiments, the network 150 uses standard communications technologies and/or protocols. For example, the network 150 includes communication links using technologies such as Ethernet, 802.11, 3G, 4G, code division multiple access (CDMA), digital subscriber line (DSL), and the like. Data exchanged over the network 150 may be represented using any suitable format, such as hypertext markup language (HTML) or extensible markup language (XML). In some embodiments, the network 150 may include encryption capabilities to ensure the security of customer data. For example, encryption technologies may include secure sockets layers (SSL), transport layer security (TLS), virtual private networks (VPNs), and Internet Protocol security (IPsec), among others.

Example Document Management System Architecture

Figure 2:
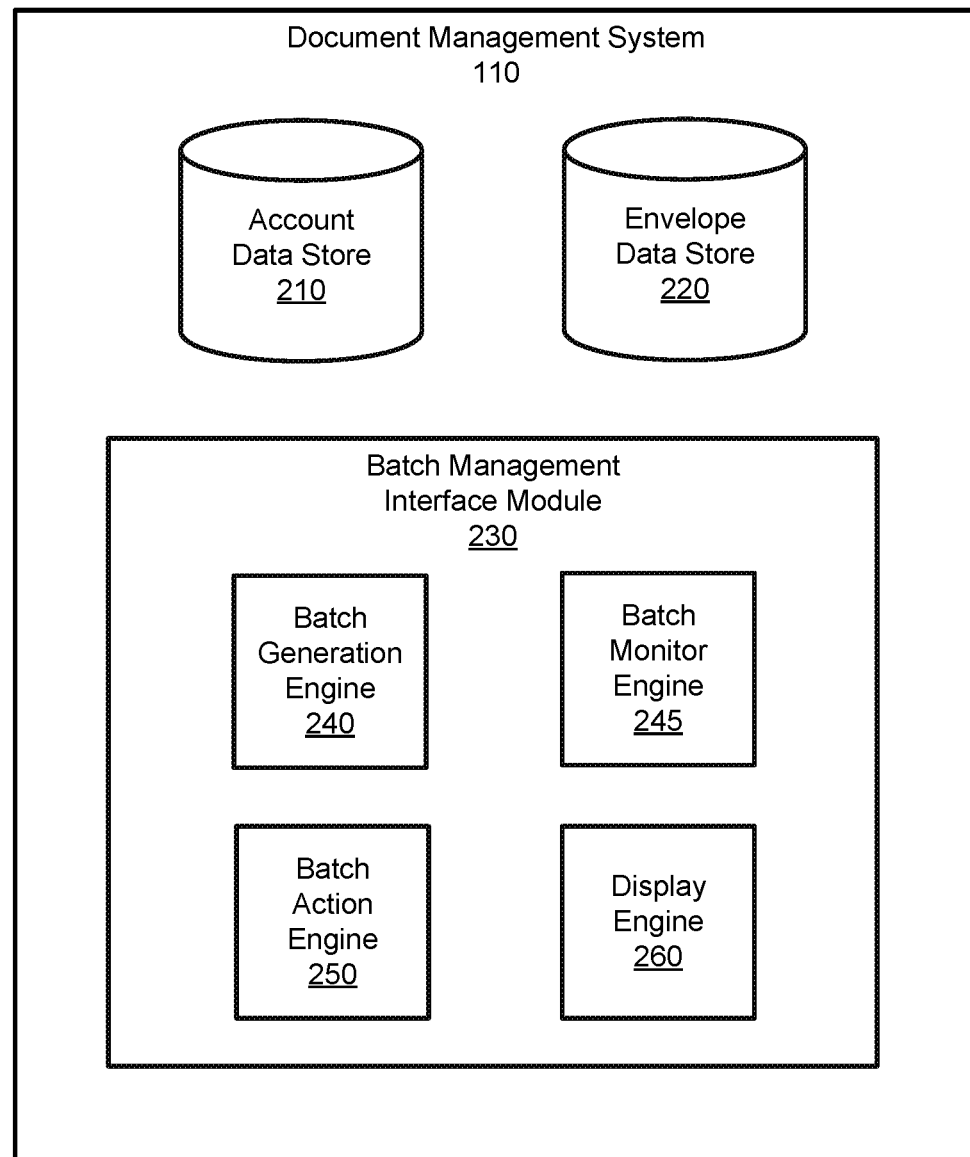
FIG. 2 is a block diagram of a document management system, in accordance with an embodiment.

FIG. 2 is a block diagram of a document management system, in accordance with an embodiment. Components of the document management system 110 may be a combination of hardware and software. The document management system 110 may include an account data store 210, an envelope data store 220, and a batch management interface module 230. In various embodiments, the document management system 110 may include fewer or additional components that are not shown in FIG. 2. For example, conventional components such as network interfaces, security functions, load balancers, failover servers, management and network operations consoles, and the like are not shown so as to not obscure the details of the system architecture. The functions of the document management system 110 may be distributed among the components in a different manner than described.

The account data store 210 is a file storage system, database, set of databases, or other data storage system storing information associated with accounts of the document management system 110. Entities (e.g., the sending entity 120) may be associated with one or more accounts with the document management system 110. In some embodiments, the receiving entities 130 are associated with accounts with the document management system 110. Each account associated with an entity may include information about the entity, such as information about individual(s) with access to the account, age of the account, frequency of account use, log of past account transactions, and the like. Information about the individual(s) with access to the account may include the individual's name, email address, address, title, role, department, and the like.

The envelope data store 220 is a file storage system, database, set of databases, or other data storage system storing information associated with envelopes (also referred to as copies). An entity (e.g., the sending entity 120) provides a set of documents to be included in an envelope. An envelope can include at least one document in the set of documents for execution. The at least one document may have been previously negotiated by the sending entity 120 and the one or more receiving entities 130. And, as such, the document(s) may be ready for execution upon the creation of an envelope. The envelope may also include a set of acting entities. The set of acting entities include who can view, edit, decline, and/or execute the document(s) included in the envelope. In some embodiments, the set of acting entities for an envelope is an individual. For example, a receiving entity 130A is an individual. In alternative embodiments, the set of acting entities for an envelope is a plurality of individuals. For example, a receiving entity 130B is a group of individuals. The set of acting entities may be designated via recipient information (e.g., contact information for the one or more acting entities). Contact information may include a name, email address, location information, or any other suitable contact information. In some embodiments, an envelope may include an access code. The access code is a unique set of numbers, letters, symbols, or any combination thereof that is provided to the set of acting entities so that the set of acting entities are able to perform one or more actions (e.g., view, edit, decline, execute) on the envelope. Without the access code or by entering an incorrect access code a predetermined number of times (e.g., three times), the set of acting entities can not perform any action on the envelope of on the set of documents therein.

Information about an envelope stored in the envelope data store 220 may include document information specific to each document of the set of documents included in an envelope. For example, document information may include document type, document content, and document tags. Document type may provide identification information about the document, such as a document name, a document hash value or other numerical identifier, and/or a document category. The document category describes a topic of the document and may include purchase agreement, contract, employee agreement, bank form, permission slip, non-disclosure agreement, checklist, instruction set, code of conduct, term sheet, etc. The document content is all the words, images, logos, symbols, etc. included within the document. The document tags indicate which fields of the document need to be completed for execution (e.g., where an acting entity or acting entities should sign, date, or initial the document).

The envelope data store 220 stores information about a batch of envelopes. A batch of envelopes is a group of envelopes that include substantially similar sets of documents. Information associated with a batch stored in the envelope data store 220 may include a status of the batch, a status of each envelope within the batch, a time corresponding to the status of each envelope (e.g., a time the status is updated), and recipient information of each envelope.

The batch management interface module 230 provides a means for an entity (e.g., the sending entity 120) to manage a bulk sending process. The batch management interface module 230 may generate an interface the sending entity 120 may interact with to manage the bulk sending process from generating a batch, to monitoring the batch, to performing an action on the batch, etc. The batch management interface module 230 may include a batch generation engine 240, a batch monitor engine 245, a batch action engine 250, and a display engine 260. In various embodiments, the batch management interface module 230 may include fewer or additional components that are not shown in FIG. 2. The functions of the batch management interface module 230 may be distributed among the components in a different manner than described.

The batch generation engine 240 generates a batch of envelopes for an entity (e.g., for the sending entity 120) for sending to a plurality of different recipients (e.g., the receiving entities 130). An envelope, as described above, includes a set of documents for execution and a set of acting entities. A batch of envelopes may include tens, hundreds, thousands, or more envelopes to be sent to a corresponding tens, hundreds, thousands, or more recipients. In some embodiments, an entity uploads the set of documents to the batch generation engine 240 and provides a listing of the plurality of different recipients to generate the batch. In alternative embodiments, an entity uploads each envelope individually and then instructs the batch generation engine 240 to generate the batch.

In some embodiments, the set of documents included in each envelope of the batch are identical. For example, the set of documents includes two documents: a first document and a second document. The first document and the second document included in a first envelope of the batch includes identical document content when compared with the first document and the second document included in all the other envelopes of the batch. In alternative embodiments, the set of documents included in each envelope of the batch are substantially similar. In the same example, the first document and the second document in each envelope may include document content customized for the particular corresponding recipient of each envelope. Specifically, the first and second document include the corresponding recipient's name as document content.

The batch generation engine 240 sends the generated batch of envelopes to the plurality of recipients during the bulk sending process. For example, the batch generation engine 240 sends every envelope of the batch to its corresponding set of acting entities.

During the generation of the batch of envelopes and the sending of the batch of envelopes, the batch monitor engine 245 tracks a status of the batch. For example, the batch monitor engine 245 can inform the sending entity 120 via the interface of the status. The status of the batch provides information regarding if the bulk send is complete (e.g., the status of the batch is processed) or is still being generated/sent by the batch generation engine 240 (e.g., the status of the batch is in-progress). Additionally or alternatively, the batch monitor engine 245 tracks a progress of the bulk send. For example, the batch monitor engine 245 via the interface may provide information about how many envelopes of the batch have been generated and/or sent versus how many envelopes total in the batch.

The batch monitor engine 245 determines if any errors took place during the generation of the batch of envelopes and/or during the sending of the batch of envelopes. The batch monitor engine 245 may notify the sending entity 120 that an error took place via the interface. An error is associated with an envelope and signifies that the envelope failed to be generated, the envelope experienced an authentication failure, or the envelope experienced a delivery failure. An envelope may fail to be generated if the envelope's name exceeds a maximum number of characters, if the sending entity 120 forgot to add a set of acting entities (e.g., forgot to input recipient information), if the sending entity 120 forgot to upload the set of documents, etc. An envelope may experience an authentication fail if the corresponding receiving entity 130 enters an incorrect access code a predetermined number times when attempting to view the received envelope. An envelope may experience a delivery failure if the sending entity 120 enters incorrect contact information for a corresponding receiving entity 130 and the batch generation engine 240 is unable to deliver the envelope.

In some embodiments, the batch monitor engine 245 provides a recommendation to the sending entity 120 regarding how to fix an error. The recommendation may be an error message for display on the interface. The recommendation may include a suggestion for the sending entity 120 to instruct the batch action engine 250 to perform a bulk action on the batch as described in more detail below.

The batch monitor engine 245 detects a status for each envelope in the batch. A status of an envelope provides information about whether an envelope is in a terminal state or in an in-progress state. A terminal state signifies that no further actions may be taken on the envelope. For example, no further action performed by the sending entity 120 via the batch action engine 250 as described in more detail below and/or performed by the corresponding receiving entity 130. A status for an envelope in the terminal state may include completed, voided, or declined. The batch monitor engine 245 determines the status of the envelope to be completed after the receiving entity 130 executes (e.g., by electronically signing) the set of documents of the envelope. The batch monitor engine 245 determines the status of the envelope to be voided after the sending entity 120 via the batch action engine 250 voids the envelope and/or voids the batch. The batch monitor engine 245 determine the status of the envelope to be declined after a receiving entity 130 declines to execute the set of documents. An in-progress state signifies that an action may still be taken on the envelope. A status for an envelope in the in-progress state may include received, viewed, or edited. The batch monitor engine 245 determines the status of the envelope to be received after the envelope is generated and sent by the batch generation engine 240 with no errors. The batch monitor engine 245 determines the status of the envelope to be viewed after the envelope is generated and sent by the batch generation engine 240 with no errors and subsequently viewed by a corresponding receiving entity 130. The batch monitor engine 245 determines the status of the envelope to be viewed after the envelope is generated and sent by the batch generation engine 240 with no errors and subsequently edited by a corresponding receiving entity 130. A corresponding receiving entity 130 may edit an envelope by editing document contents within one or more documents of the set of documents, by adding an acting entity to the set of acting entities, by adding a document to the set of documents, etc.

The batch monitor engine 245 updates the status of the envelope based on actions performed by either the sending entity 120 and/or the receiving entity 130. For example, the batch monitor engine 245 receives an indication that a corresponding recipient has taken an action with respect to the corresponding envelope they received. For example, a recipient may receive the envelope and review the set of documents and document content of the envelope, the batch monitor engine 245 receives an indication that the receiving entity 130 performed an action (viewing) with respect to the envelope. As such, the batch monitor engine 245 updates the status of the envelope from received to viewed based on the indication.

The batch monitor engine 245 tracks and updates a time corresponding to the status for each envelope in the batch. The batch monitor engine 245 updates the time to reflect when the status of an envelope was updated. The time may be a date or a date and time. For example, the batch monitor engine 245 receives an indication that a recipient executed the set of documents on 02/02/2021, the batch monitor engine 245 updates the time to be 02/02/2021 from the previous time of 01/02/2021 associated with the previous status of viewed.

The batch action engine 250 performs an action on a batch per a request of the sending entity 120. In some embodiments, performing a bulk action includes performing a correction action of a set of envelopes within a batch. A correction action may include adding a document to the set of documents in some or all envelopes of the batch, modifying content within one or more documents, correcting a spelling of a name of a signing entity, correcting a location of one or more tags within a document, correcting a type of one or more tags within a document, adding a tag or field to the document, and performing any other modification to the document or the documents within an envelope. In some embodiments, a correction action may include modifying, creating, or removing a reminder notification to be sent to entities associated with the set of envelopes within the batch. In some embodiments, a correction action may include changing an expiration date or due date associated with an envelope or document, changing an order in which entities are to sign documents within the envelope, adding or removing one or more signing entities associated with the envelope, locking one or more documents within the envelope until a particular action happens (e.g., a first signing entity signs a document within the envelope), and the like.

After a correction action has been performed, one or more documents within the set of envelopes within a batch can be modified based on the correction, and/or can be re-sent to entities associated with the envelopes within the batch. In some embodiments, only envelopes within the batch that have not been executed can be corrected and re-sent. In other embodiments, all envelopes are corrected and re-sent. In such embodiments, previously executed envelopes (e.g., envelopes executed before the bulk correction action has been performed) can be re-sent within an additional document that, when executed, voids the previously executed envelope.

In some embodiments, performing a bulk action includes performing a re-sending action on a set of envelopes within a batch. Performing a re-sending action may include providing one or more envelopes to their corresponding recipients again and/or notifying the recipients of an outstanding envelope awaiting an action (e.g., yet to be viewed and/or executed). In some embodiments, performing a re-sending action may include waiting for the passage of a threshold amount of time or for the occurrence of a triggering action and then re-sending one or more envelopes to their corresponding recipients. Examples of triggering actions can include the execution of an envelope by a particular recipient, the execution of envelopes within a batch by a threshold percentage of recipients, or the occurrence of any other suitable condition. In some embodiments, performing a re-sending action can include modifying a recipient for a particular envelope (e.g., in the event that an initial recipient does not execute the envelope within a threshold amount of time) and re-sending the envelope to a replacement recipient (e.g., an entity determined to have equivalent signature authority or the like).

Re-sending actions may be performed on a subset of a set of envelopes within a batch. For instance, in some embodiments, only envelopes within the batch that have not previously been executed may be re-sent. Likewise, in some embodiments, only envelopes that have been viewed, or only envelopes that have been viewed, may be re-sent. In some embodiments, performing a re-sending action may be realized by re-sending an envelope to a recipient via a different medium. For example, an envelope may be sent to a recipient via email, and may be re-sent via a mobile device notification.

In some embodiments, performing a bulk action includes performing a voiding action on a set of envelopes within a batch. Performing a voiding action may include removing one or more envelopes from view of the corresponding recipient(s) and providing a message to each of the recipients indicating the corresponding envelope has been voided. In some embodiments, performing a voiding action can include voiding only a subset of documents within each envelope of the set of envelopes in the batch. For instance, for a bulk sent envelope each within ten different documents, if two of the documents are voided, the two documents within each envelope are removed/deleted while all remaining documents within the envelopes are preserved within the envelopes. In some embodiments, voiding actions can be conditional. For instance, in some embodiments, a voiding action may be performed after a threshold amount of time has passed without an envelope being executed.

In some embodiments, voiding actions may be performed on a subset of envelopes within a batch. For instance, in some embodiments, only envelopes that haven't been executed or that haven't been viewed are voided. In some embodiments, all envelopes can be voided. In such embodiments, documents can be sent for execution by recipients that have previously executed envelopes that, when executed, void the previously executed envelope.

In some embodiments, performing a bulk action includes performing a download action on a set of envelopes within a batch. Performing a download action can include download a set of envelopes based on a status of the envelopes. For instance, performing a download action can cause all executed envelopes to be downloaded, but not any envelopes in progress or that haven't been executed. In some embodiments, performing a download action can include downloading form or field data (e.g., data that envelope recipients enter into fields within the documents of the envelopes). Downloading form or field data can include downloading all data entered by recipients within one or more fields identified by a user performing the download action. Downloaded form or field data can be arranged within a spreadsheet or a database table, organized such that all data corresponding to a particular field downloaded form different envelopes can be viewed within a same interface (e.g., the data from each field can be organized within a different spreadsheet tab or database table).

In some embodiments, performing a download action can include downloading data from envelopes or downloading envelopes that have changed since a previous download action was performed. For instance, performing a download action can include downloading envelopes that have been executed since the last time a download action was performed, without downloading envelopes that haven't been executed and without downloading envelopes that were previously executed (e.g., before a last download action was performed). Likewise, performing a download action can include downloading data within fields that has been entered or modified by recipients since a last time a download action was performed, without downloading field that was entered and not modified since before a last download action was performed.

As described above, the batch action engine 250 may perform actions only on envelopes within the batch based on an in-progress state of the envelope (e.g., envelopes with a status of received, viewed, edited, executed, not viewed, rejected, and the like). Based on the statuses, the batch action engine 250 can perform the bulk action on the batch (on all envelopes within the batch), on a subset of envelopes within the batch, or on an envelope within the batch. For instance, in some embodiments, only envelopes within the batch that have been rejected may be corrected via the performance of a corrective action and re-sent to a corresponding recipient.

The batch action engine 250 may select which envelope (s) to perform one or more actions on based on a parameter specified by the sending entity 120. The parameter may include a status parameter, a timing parameter, a recipient parameter, and a document parameter. The status parameter includes specifying one or more particular statuses of envelopes. For example, the sending entity 120 specifies that a correction (action) be made on all envelopes with the status of received (particular status). The timing parameter includes specifying a particular time that corresponds to the status of envelopes. For example, the sending entity 120 specifies that a re-send (action) be performed on any envelope with a time prior to the particular time.

The recipient parameter includes specifying recipient information of envelopes. For example, the sending entity 120 specifies that a correction (action) be performed on any envelope with particular location information (recipient information). The document parameter includes specifying document type and/or document content of envelopes. For example, the sending entity 120 specifies that a void (action) be performed any envelope with a particular document category (document type).

In some embodiments, the batch action engine 250 may select which envelopes to perform one or more actions on based on pre-determined rules associated with the batch action engine, based on rules associated with recipient entities, based on jurisdictional rules, and the like. For instance, in some embodiments, recipient entities may require envelopes to expire if not executed within 24 hours, and the batch action engine 250, in response to the passage of 24 hours, may select all non-executed envelopes within the batch for voiding. Likewise, certain jurisdictions may discourage or prevent envelopes from being modified after they are executed. In such embodiments, only envelopes within a batch that haven't been executed may be selected for the performance of a correction.

In some embodiments, the batch action engine 250 selects which envelope(s) to perform one or more actions on based on a combination of parameters. For example, the sending entity 120 requests a batch re-send (action) be performed by the batch action engine 250 on any envelopes with a status of received (status parameter) and a time of 02/03/2021 10:30 am (time parameter). The batch action engine 250 identifies envelope(s) that satisfy the status parameter and the time parameter. Thus, the batch action engine 250 identifies envelope(s) of the batch that have both a status of received and a time prior to 02/03/2021 10:30 am. The batch action engine 250 performs a re-send on the identified envelope(s). The batch action engine 250 sends the envelope(s) to the corresponding recipients and notifies the recipients (e.g., via a message) that their received envelope is awaiting further action from them.

In some embodiments, the sending entity 120 requests that batch action engine 250 perform two actions (a correction and a re-send) based on an error that took place during the generation and/or sending of the batch via the batch generation engine 240. The batch action engine 250 identifies the envelope(s) that had an error and performs a correction on the envelope(s). For example, an envelope in the batch experienced a delivery failure due to the recipient information being incorrectly entered during the generation of the batch. The sending entity 120 via the batch action engine 250 corrects the recipient information. The batch action engine 250 performs a re-send on the corrected envelope.

The display engine 260 generates one or more interface elements (e.g., links, buttons, checkboxes, search bars, drop-down menus, etc.) on an electronic display of a user device 140 for a sending entity 120 or receiving entity 130 to interact with in regard to the management of the bulk sending process. The display engine 260 may generate and display one or more messages and/or notifications to an entity providing information to the entity about the bulk sending process. The display engine 260 may provide a means for an entity to provide instruction or feedback to the document management system 110 regarding the bulk sending process. The display engine 260 and example user interfaces will be discussed further below in relation to FIGS. 3A and 3B

Example User Interfaces

FIG. 3A illustrates a first example user interface for managing a bulk sending process, in accordance with an embodiment. In alternative configurations, different and/or additional components may be included in the example user interface 300.

The first example user interface 300 displays various batches (e.g., include a batch 310 and a batch 320) generated by the sending entity 120 via the document management system 110. This user interface 300 may be displayed to the sending entity 120 via the display engine 260 on the client device 140A. Each batch includes a batch name, a status of the batch, a progress, and a date of submittal to the document management system 110. For example, the batch 310 has a batch name of "New Hires January 2021", a status of the batch of in-progress, a progress of 20/100 envelopes sent, and a date of submittal of 01/18/2021. In another example, the batch 320 has a batch name of "New Benefits", a status of the batch of processed, a progress of 9100/9100 envelopes sent, and a date of submittal of 11/16/2020. The progress of batch 320 designates that an envelope (i.e., 1 of the 9100 envelopes total) experienced an error in the generation or sending processes performed by the batch generation engine 240. In order to view more information about a particular batch (e.g., the batch 320), the sending entity 120 selects batch 320. The display engine 260 displays a second user interface 305 presenting the information about the particular batch described in more detail in FIG. 3B.

In some embodiments, the display engine 260 automatically updates the progress of a batch with a status of in-progress as each envelope is sent to a corresponding receiving entity 130. For example, the progress of batch 310 will increase as each envelope in the batch is successfully sent to a corresponding recipient.

The display engine 260 provides several interface elements (e.g., a search bar 330 and a filter button 340). The sending entity 120 can search for a specific batch by name or by another identifier in the search bar 330. The sending entity 120 can filter the batches by status or date of submittal by selecting the filter button 340.

FIG. 3B illustrates a second example user interface for managing a bulk sending process, in accordance with an embodiment. In alternative configurations, different and/or additional components may be included in the example user interface 305.

The second example user interface 305 displays information about the batch 320 generated and sent by the sending entity 120 via the document management system 110. The user interface 305 displays the envelopes included in the batch 320. Only four of the envelopes are presented in FIG. 3B; however, all envelopes included in the batch 320 could be displayed in the interface 305.

The display engine 260 provides several interface elements (e.g., a search bar 350 and a filter button 360). The sending entity 120 can search for a specific envelope by name or by another identifier in the search bar 350. The sending entity 120 can filter the envelopes within the batch 320 by status or a time that corresponds to the status by selecting the filter button 360. The display engine 260 notifies the sending entity of an error that occurred during the generation or sending of the batch 320 by displaying message 370. The message 370 includes an interface element (e.g., a link 375) the sending entity 120 may select to learn about which envelope experienced an error and, in some embodiments, how to fix the error.

The user interface 305 displays statuses 380 for the envelopes in the batch (e.g., declined completed, received, and viewed). The statuses 380 may be utilized by the document management system 110 to select a subset of envelopes to perform one or more actions on (e.g., a void on envelopes with statuses of received or viewed). The user interface 305 displays times 385 for the envelopes in the batch. The times 385 correspond to a time when the status of the envelope was updated. The times 385 may be utilized by the document management system 110 to select a subset of envelopes to perform one or more actions on (e.g., a correction and a re-send on envelopes with a time prior to 01/10/2021).

The user interface 305 displays actions to be performed on the subset of envelopes in a drop-down menu 390 (i.e., an interface element). For example, the sending entity 120 may select from the drop-down menu 390 a void action. In some embodiments, additional user interfaces may be displayed by the display engine 260 to the sending entity 120 requesting one or more parameters in order to identify the subset of envelopes the void action is performed on by the batch action engine 250.

Process for Performing Bulk Action

FIG. 4 is a flowchart illustrating a process of performing a bulk action on a subset of envelopes in a batch, in accordance with an embodiment. The process 400 shown in FIG. 4 may be performed by components of a document management system (e.g., the document management system 110). Other entities may perform some or all of the steps in FIG. 4 in other embodiments. It should be noted that in other embodiments, the process 400 illustrated in FIG. 4 can include fewer, additional, or different steps that those described herein.

The document management system sends 410 a distinct copy (also referred to as an envelope) of a set of documents to each of a plurality of recipients (e.g., the plurality of receiving entities 130) in a bulk sending process. The bulk sending process may be initiated by a user (e.g., the sending entity 120) requesting to create a batch of copies of the set of documents to be sent to the plurality of recipients. Each copy of the set of documents is associated with one or more actions to be taken by a corresponding recipient. For example, a recipient may view the copy of the set of documents, may edit the copy of the set of documents, may decline the copy of the set of documents, and/or may execute the copy of the set of documents.

The document management system generates 420 an interface that displays, for each copy of the set of documents, the recipient of the copy and a status of the copy. The status provides the sending entity with information about whether a recipient has performed and or has yet to perform an action associated with the copy. For example, the status of the copy may be completed to signify to the sending entity that the copy has been executed by the recipient. The status of the copy may be received to signify to the sending entity that the copy has been sent to the recipient and the recipient still has yet to perform any action corresponding to the copy. The status may be declined to signify to the sending entity that the copy was declined by the recipient (e.g., due to the recipient not wanting to sign the copy). In some embodiments, the status provides the sending entity with information about whether the sending entity performed an action associated with the copy. For example, the status of the copy may be voided to signify to the sending entity that the sending entity has voided the copy. By voiding the copy, the corresponding receiving entity no longer has any action to perform associated with the copy.

The document management system receives 430 an identification of a subset of the copies of the set of documents. In some embodiments, the identification of the subset of the copies of the set of documents is based on the status of the copies. For example, a sending user identifies a status of viewed, thereby resulting in the identification of the subset of the copies including only copies with the status of viewed. In this embodiments, the identification of the subset of the copies is based on a status parameter. In other embodiments, the identification of the subset of the copies is based on one or more other parameters. For example, the document management system may select the subset of the copies based on a timing parameter, a recipient parameters, and/or a document parameter. The timing parameter is selecting copies from the batch that satisfy a specified time (e.g., a time associated with the status of the copies). The recipient parameter is selecting copies from the batch that satisfy specified recipient information (e.g., location information). The document parameter is selecting copies from the batch that satisfy specified document type and/or document content (e.g., a document category, a dollar amount, etc.).

The document management system performs 440 a bulk action on each of the subset of the copies without performing the bulk action on any remaining copies of the set of documents. A bulk action may be a bulk void, a bulk re-send, or a bulk correction. The bulk void removes each of the subset of the copies from view of the corresponding recipient. The bulk re-send provides each of the subset of the copies to the corresponding recipients again. The bulk correction adds and/or removes documents, recipients, etc. from the subset of the copies.

FIG. 5 is a flowchart illustrating a process of performing a bulk correction action on envelopes in a batch, in accordance with an embodiment. The process 500 shown in FIG. 5 may be performed by components of a document management system (e.g., the document management system 110). Other entities may perform some or all of the steps in FIG. 5 in other embodiments. It should be noted that in other embodiments, the process 500 illustrated in FIG. 5 can include fewer, additional, or different steps that those described herein.

A batch of document sets is sent 510 to each of a plurality of recipients in a bulk sending process. An interface is generated 520 that displays, for each set of documents in the batch, the recipient and status of the set of documents. For instance, an execution status of each envelope in the batch can be displayed, in association with an identity of a recipient associated with the envelope.

A request to perform a bulk correction action is received 530. A first subset of the batch of document sets that have not been executed is identified 540, and a second subset of the batch of document sets that have been executed is identified 550. The bulk correction action is performed 560 on the first subset of the batch of document sets. In some embodiments, performing the bulk correction action modifies the first subset of the batch of document sets, and the modified batch of document sets is re-sent to corresponding recipients. An alternative bulk correction action is performed 570 on the second subset of the batch of document sets. For instance, a notification can be sent to recipients that have executed the document sets to indicate that an updated document set needs to be executed.

FIG. 6 is a flowchart illustrating a process of performing a bulk void action on envelopes in a batch, in accordance with an embodiment. The process 600 shown in FIG. 6 may be performed by components of a document management system (e.g., the document management system 110). Other entities may perform some or all of the steps in FIG. 6 in other embodiments. It should be noted that in other embodiments, the process 600 illustrated in FIG. 6 can include fewer, additional, or different steps that those described herein.

A batch of document sets is sent 610 to each of a plurality of recipients in a bulk sending process. An interface is generated 620 that displays, for each set of documents in the batch, the recipient and status of the set of documents. For instance, an execution status of each envelope in the batch can be displayed, in association with an identity of a recipient associated with the envelope.

A request to perform a bulk void action is received 630. A first subset of the batch of document sets that have not been executed is identified 640, and a second subset of the batch of document sets that have been executed is identified 650. The bulk void action is performed 660 on the first subset of the batch of document sets. In some embodiments, performing the bulk void action prevents recipients from executing the document sets in the first subset. An alternative bulk void action is performed 670 on the second subset of the batch of document sets. For instance, a document can be generated and sent to recipients that, when executed, voids the previously executed document sets.

Bulk Envelope Identification and Suggestion

In some embodiments, the batch generation engine 240 identifies envelopes sent by a user separately to a plurality of recipients (e.g., and not sent as a batch or in bulk). In such embodiments, the batch generation engine 240 can determine that the envelopes are sufficiently related that they may qualify as a batch of envelopes (e.g., they can be managed as a batch of envelopes). Such envelopes can be candidates for inclusion in a batch of envelopes, the batch of envelopes defined after the envelopes are sent, enabling a user to manage the batch of envelopes as described herein.

The batch generation engine 240 can determine that envelopes are sufficiently related if the envelopes satisfy one or more similarity criteria. In some embodiments, a similarity criteria can include the envelopes being sent by a same user, or by users associated with a same group or entity. In some embodiments, a similarity criteria can include the envelopes being sent within a proximity or within a threshold interval of time (e.g., within an hour, within 24 hours, or within any other suitable interval).

In some embodiments, a similarity criteria can include envelopes with similar or identical documents. For instance, envelopes that include a threshold number of identical documents (e.g., documents with the same content except for field/tag text or values) can be considered part of the same batch of envelopes. In some embodiments, envelopes that share a single common document can be considered part of the same batch of envelopes. In some embodiments, envelopes that are sent for a common or similar purpose can be considered part of the same batch of envelopes. For instance, employment agreements sent to employees in different states on the same day can be considered part of the same batch of envelopes, even if there is significant difference between the envelopes (for instance, employee agreements can vary between states, and thus envelopes sent for a common intent can be considered part of a same batch despite including different documents).

In some embodiments, a similarity criteria can include envelopes sent to a common entity, or receiving users associated with a common entity. For instance, a set of envelopes sent to employees of a company or members of an organization can be considered part of a batch of envelopes, despite including different documents. In some embodiments, a similarity criteria can include envelopes that were created using a same template. For instance, envelopes that were sent to different users, at different times, and/or that include different documents can be considered part of a batch of envelopes if they were created using a same template. Other similarity criteria can include envelopes including a threshold percentage or amount of content in common, including a common clause, including a common named signing entity, including a common document type, or including any other similar content.

In some embodiments, the similarity criteria can be user-defined. For instance, a user may specify that envelopes that have a user-specified amount of documents in common may be considered part of a batch of envelopes. In some embodiments, the similarity criteria can be determined based on other batches of envelopes sent by a user, based on users similar to a user, based on other batches of envelopes sent by an entity to which a user belongs, or based on any other set of historical envelopes. For instance, if historical batches of envelopes sent by a user have a threshold percentage of content in common, then future envelopes sent by the user not included in a batch of envelopes can nonetheless be considered as part of a batch of envelopes if the envelopes have the threshold percentage of content in common.

After a set of envelopes not explicitly sent as a batch of envelopes is determined to be sufficiently related that they may qualify as a batch of envelopes, the batch generation engine 240 can combine the set of envelopes into a batch of envelopes. In some embodiments, the batch generation engine 240 can suggest that a user combine such envelopes into a batch. If the user agrees to combine the envelopes into a batch, the envelopes can subsequently be managed as a batch of envelopes as described herein. For instance, a user can take a bulk action on the batch of envelopes or a subset of the batch of envelopes collectively, without having to perform the action individually on each envelope.

In some embodiments, the batch generation engine 240 can automatically combine the set of envelopes into a batch of envelopes, without user input. For instance, if a user sends a set of envelopes to recipients and the batch generation engine 240 determines that the envelopes are sufficiently related to be considered a batch of envelopes, the batch generation engine 240 can classify the set of envelopes as a batch of envelopes and can make one or more batch envelope management features available to the user without requiring action by the user.

FIG. 7 is a flowchart illustrating a process of combining envelopes sent separately into a batch of envelopes, in accordance with an embodiment. Document sets sent individually by a sending entity are accessed 710. These document sets can include all sets sent by a sending entity account, document sets sent during a particular interval of time, and the like. A subset of the accessed document sets that satisfy one or more similarity criteria are identified 720. The similarity criteria can be set to establish a likelihood that document sets that satisfy the similarity criteria are related (e.g., by being part of a batch of document sets, despite being sent separately).

An interface presented to the sending entity is modified 730 to include a suggestion to combine the identified subset of the accessed document sets. The identified subset of document sets are combined 740 into a batch of document sets based on a request from the sending entity. A request is received 750 to perform a bulk action from the sending entity, for instance a bulk correction action or a bulk void action. In response, the bulk action is performed 760 on the accessed document sets within the batch but not on the accessed document sets not included in the batch.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computer system 500$s$ referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    sending, by a document management system, a first copy of one or more documents to a first recipient, a second copy of the one or more documents to a second recipient, and a third copy of the one or more documents to a third recipient in a bulk sending process;
    generating, by the document management system, a user interface that displays, for the first copy an indication of the first recipient and a status of the first copy, displays, for the second copy, an indication of the second recipient and a status of the second copy, and displays, for the third copy, an indication of the third recipient and a status of the third copy; and
    performing, by the document management system and based on a request received via the user interface, the status of the first copy, and the status of the second copy, a bulk correction action on the first copy and the second copy, wherein performing the bulk correction action comprises:

modifying the first copy to produce a modified first copy;

modifying the second copy to produce a modified second copy; and resending the modified first copy to the first recipient and the modified second copy to the second recipient.

2. The method of claim 1, wherein the bulk corrective action modifies content of a document of the one or more documents.

3. The method of claim 1, wherein the bulk corrective action modifies a document clause or document text within a document of the one or more documents.

4. The method of claim 1, wherein the bulk corrective action modifies one or more of a signing entity associated with a document of the one or more documents, an expiration date associated with the document, an order in which the document needs to be signed by signing entities, and an action that needs to be taken by a recipient of the document.

5. The method of claim 1, wherein the status of the first copy indicates that the first copy has not been executed, the status of the second copy indicates that the second copy has not been executed, and the status of the third copy indicates that the third copy has been executed, the method further comprising:

sending, by the document management system, a fourth copy of the one or more documents to a fourth recipient and performing, by the document management system and based on a second request received via the user interface, the status of the third copy, and a status of the fourth copy indicating that the fourth copy has been executed, an alternative bulk correction action on the third copy and the fourth copy to produce a modified third copy and a modified fourth copy.

6. The method of claim 5, wherein performing the alternative bulk corrective action comprising sending a notification to the third recipient and the fourth recipient indicating that an executed document has been modified.

7. The method of claim 5, wherein performing the alternative bulk corrective action comprises sending an additional document to the third recipient and the fourth recipient that, when executed, voids an executed document.

8. Non-transitory computer-readable storage media storing executable instructions that, when executed by one or more processors, cause the one or more processors to:

send a first copy of one or more documents to a first recipient, a second copy of the one or more documents to a second recipient, and a third copy of the one or more documents to a third recipient in a bulk sending process;

generate a user interface that displays, for the first copy an indication of the first recipient and a status of the first copy, displays, for the second copy, an indication of the second recipient and a status of the second copy, and displays, for the third copy, an indication of the third recipient and a status of the third copy; and perform, based on a request received via the user interface, the status of the first copy, and the status of the second copy, a bulk correction action on the first copy and the second copy, wherein to perform the bulk correction action the instructions cause the one or more processors to:

modify the first copy to produce a modified first copy;

modify the second copy to produce a modified second copy; and resend the modified first copy to the first recipient and the modified second copy to the second recipient.

9. The non-transitory computer-readable storage media of claim 8, wherein the bulk corrective action modifies content of a document of the one or more documents.

10. The non-transitory computer-readable storage media of claim 8, wherein the bulk corrective action modifies a document clause or document text within a document of the one or more documents.

11. The non-transitory computer-readable storage media of claim 8, wherein the bulk corrective action modifies one or more of a signing entity associated with a document of the one or more documents, an expiration date associated with the document, an order in which the document needs to be signed by signing entities, and an action that needs to be taken by a recipient of the document.

12. The non-transitory computer-readable storage media of claim 8, wherein the status of the first copy indicates that the first copy has not been executed, the status of the second copy indicates that the second copy has not been executed, and the status of the third copy indicates that the third copy has been executed, wherein the instructions further cause the one or more processors to:

send a fourth copy of the one or more documents to a fourth recipient; and perform, based on a second request received via the user interface, the status of the third copy, and a status of the fourth copy indicating that the fourth copy has been executed, an alternative bulk correction action on the third copy and the fourth copy to produce a modified third copy and a modified fourth copy.

13. The non-transitory computer-readable storage media of claim 12, wherein to perform the alternative bulk corrective action, the instructions cause the one or more processors to send a notification to the third recipient and the fourth recipient indicating that an executed document has been modified.

14. The non-transitory computer-readable storage media of claim 12, wherein to perform the alternative bulk corrective action, the instructions cause the one or more processors to send an additional document to the third recipient and the fourth recipient that, when executed, voids an executed document.

15. A document management system comprising:

one or more processors; and a non-transitory computer-readable storage media storing executable instructions that, when executed by the one or more processors, cause the one or more processors to:

send a first copy of one or more documents to a first recipient, a second copy of the one or more documents to a second recipient, and a third copy of the one or more documents to a third recipient in a bulk sending process;

generate a user interface that displays, for the first copy an indication of the first recipient and a status of the first copy, displays, for the second copy, an indication of the second recipient and a status of the second copy, and displays, for the third copy, an indication of the third recipient and a status of the third copy; and perform, based on a request received via user interface, the status of the first copy, and the status of the second copy, a bulk correction action on the first copy and the second copy, wherein to perform the bulk correction action the instructions cause the one or more processors to:

modify the first copy to produce a modified first copy;

modify the second copy to produce a modified second copy; and resend the modified first copy to the first recipient and the modified second copy to the second recipient.

16. The document management system of claim 15, wherein the bulk corrective action modifies content of a document of the one or more documents.

17. The document management system of claim 15, wherein the bulk corrective action modifies a document clause or document text within a document of the one or more documents.

18. The document management system of claim 15, wherein the bulk corrective action modifies one or more of a signing entity associated with a document of the one or more documents, an expiration date associated with the document, an order in which the document needs to be signed by signing entities, and an action that needs to be taken by a recipient of the document.

19. The document management system of claim 15, wherein the status of the first copy indicates that the first copy has not been executed, the status of the second copy indicates that the second copy has not been executed, and the status of the third copy indicates that the third copy has been executed, wherein the instructions further cause the one or more processors to:
- send a fourth copy of the one or more documents to a fourth recipient; and
- perform, based on a second request received via the user interface, the status of the third copy, and a status of the fourth copy indicating that the fourth copy has been executed, an alternative bulk correction action on the third copy and the fourth copy to produce a modified third copy and a modified fourth copy.

20. The document management system of claim 19, wherein to perform the alternative bulk corrective action, the instructions cause the one or more processors to send an additional document to the third recipient and the fourth recipient that, when executed, voids an executed document.

* * * * *